(12) United States Patent
Karlsson

(10) Patent No.: US 8,405,627 B2
(45) Date of Patent: Mar. 26, 2013

(54) TOUCH INPUT DISAMBIGUATION

(75) Inventor: David Karlsson, Lund (SE)

(73) Assignee: Sony Mobile Communications AB, Lund (SE)

( * ) Notice: Subject to any disclaimer, the term of this patent is extended or adjusted under 35 U.S.C. 154(b) by 126 days.

(21) Appl. No.: 12/961,728

(22) Filed: Dec. 7, 2010

(65) Prior Publication Data

US 2012/0144298 A1      Jun. 7, 2012

(51) Int. Cl.
*G06F 3/041*         (2006.01)
(52) U.S. Cl. ........................................... 345/173
(58) Field of Classification Search .................. 345/156, 345/168, 169, 173, 629; 715/700
See application file for complete search history.

(56) References Cited

U.S. PATENT DOCUMENTS

| | | | | |
|---|---|---|---|---|
| 4,733,222 A * | 3/1988 | Evans | ............................ | 341/33 |
| 7,614,008 B2 * | 11/2009 | Ording | ......................... | 715/773 |
| 2007/0008299 A1 * | 1/2007 | Hristov | ......................... | 345/173 |
| 2010/0028811 A1 * | 2/2010 | Geaghan | ....................... | 430/319 |
| 2010/0220065 A1 * | 9/2010 | Ma | ................................. | 345/173 |
| 2011/0050619 A1 * | 3/2011 | Griffin | .......................... | 345/174 |
| 2011/0084929 A1 * | 4/2011 | Chang et al. | ................... | 345/173 |
| 2011/0096011 A1 * | 4/2011 | Suzuki | ........................... | 345/173 |
| 2011/0221684 A1 * | 9/2011 | Rydenhag | ...................... | 345/173 |
| 2011/0285657 A1 * | 11/2011 | Shimotani et al. | ............ | 345/173 |
| 2011/0310024 A1 * | 12/2011 | Sakatsume | ..................... | 345/173 |
| 2012/0113018 A1 * | 5/2012 | Yan | ................................ | 345/173 |

* cited by examiner

*Primary Examiner* — Joe H Cheng

(74) *Attorney, Agent, or Firm* — Snyder, Clark, Lesch & Chung LLP

(57) ABSTRACT

A user device may display content items in a content area on a touch screen display of the user device. The user device may detect a touch and determine a location of a contact area corresponding to the touch. If the contact area includes more than one target, the user device may request further user input, with respect to the selection, and defer performing a function corresponding to the selection.

17 Claims, 7 Drawing Sheets

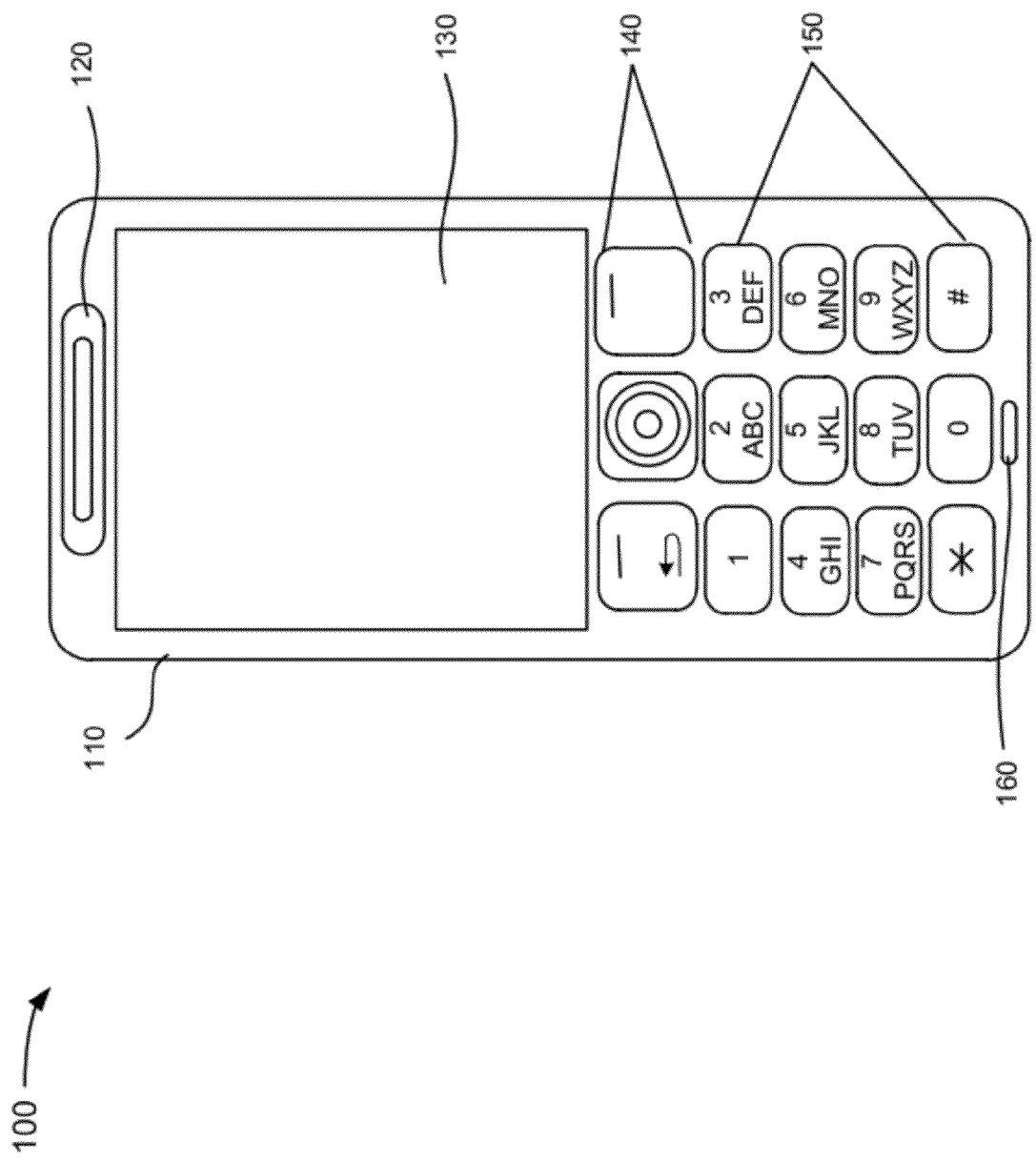

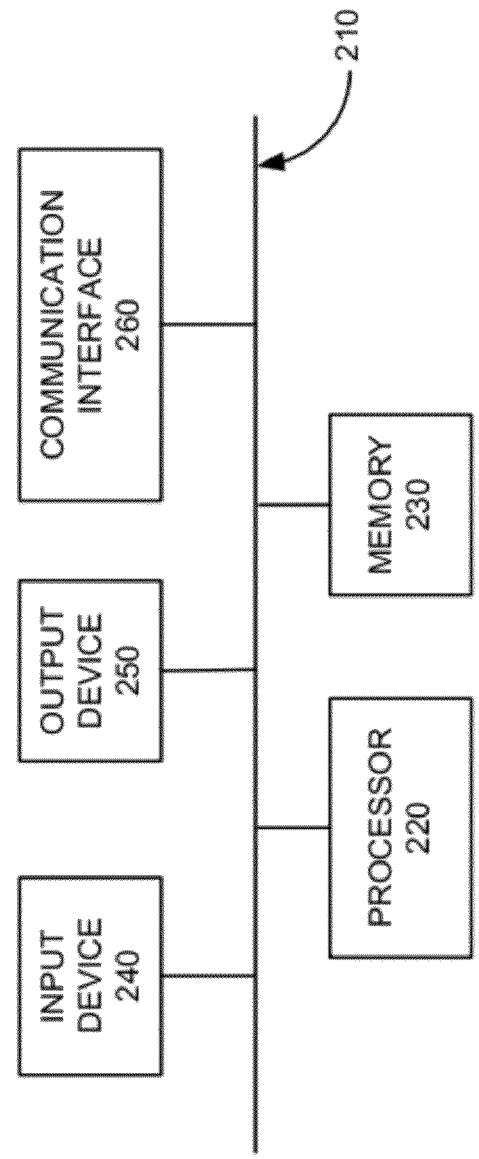

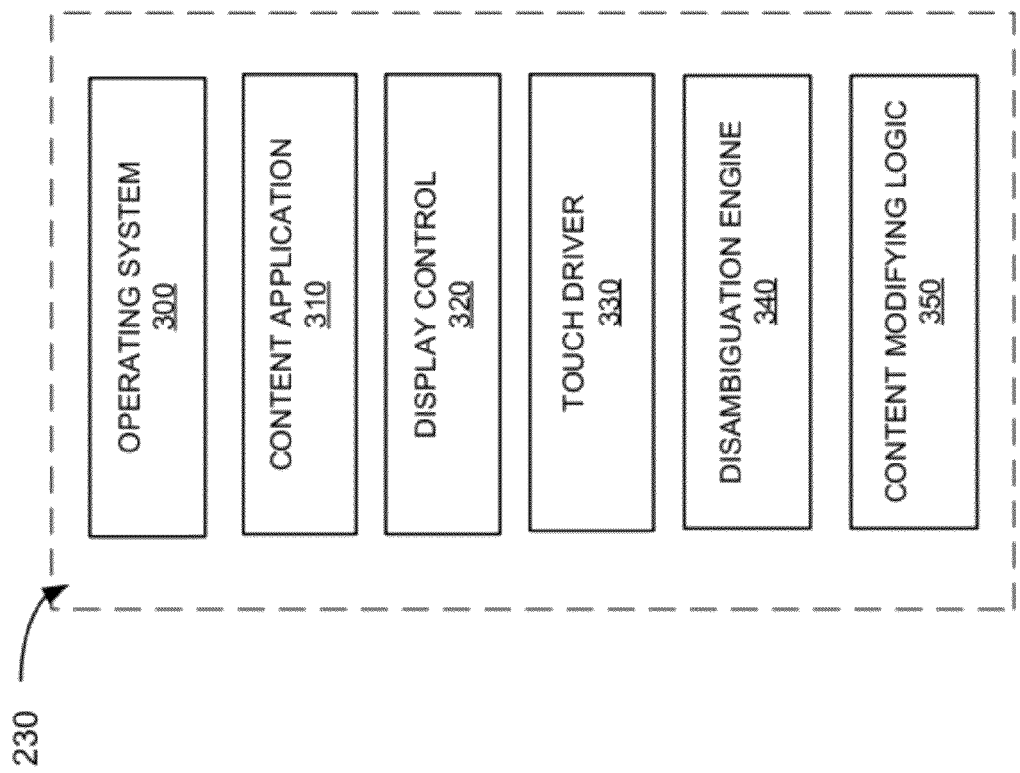

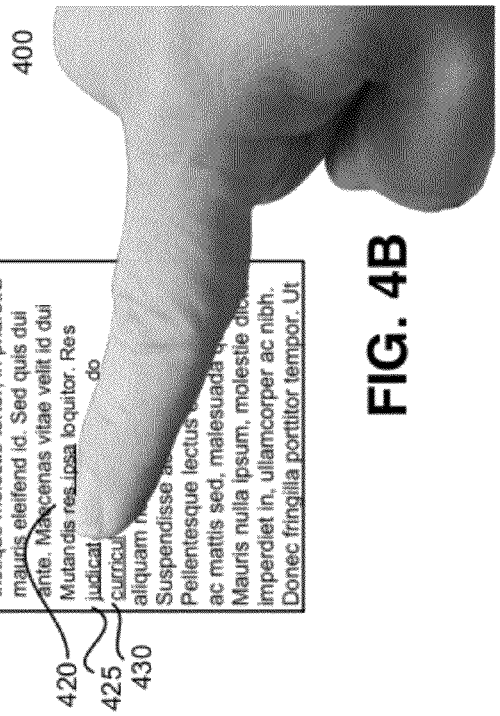

TOUCH INPUT DISAMBIGUATION

TECHNICAL FIELD OF THE INVENTION

The invention relates generally to mobile devices and, more particularly, to user input received via a touch screen display on a communication device.

DESCRIPTION OF RELATED ART

Computer, communication, and entertainment devices, such as personal computers (PCs), laptop computers, mobile terminals, personal digital assistants (PDAs), music playing devices, etc., often include a touch screen display that allows a user to interact with the device via the touch screen. That is, by touching (e.g., tapping, pressing, etc.) a particular location on the touch screen, a user may "select" a display item to execute a function corresponding to the display item. Problematically, limitations with respect to display area dimensions, size of display items, screen resolution, etc., relative to finger size, often introduce imprecision with respect to ascertaining a user's intended selection, thereby leading to "miss-hits" and user dissatisfaction.

For example, targets (e.g., selectable elements) may be sufficiently spaced apart to be visually distinguishable to a user, but too close together for the user to touch one without touching the other, which creates an ambiguity with respect to the user's intended selection. Consequently, the device may be incapable of intelligently differentiating between two (or more) closely-spaced targets associated with a contacted area of the display. Conventional devices are configured to resolve such multi-target selections without further user input (e.g., requesting confirmation/clarification). This practice produces results which, as often as not, misinterpret the user's input and activate an incorrect function. When these miss-hits activate a hyperlink (or "link"), the user is typically required to perform several extraneous input steps to return to the content display from which the erroneous selection was made, in order make another attempt at selecting the intended target.

SUMMARY

According to one aspect, a method, performed in a user device, may include displaying content via a touch screen display of the user device; detecting a touch, of the touch screen display, from a user of the user device; determining a location of the touch; determining whether the location is associated with a plurality of targets, wherein the plurality of targets includes an intended target; determining, when the location is associated with the plurality of targets, a relative value for each of the targets; determining whether more than one of the relative values exceeds a particular threshold; modifying, when more than one of the relative values exceeds a particular threshold, particular targets, of the plurality of targets, associated with the more than one of the relative values; and presenting, via the touch screen display, the particular targets to the user for selection of the intended target.

Additionally, when the location is associated with a single target, the method may further include performing, without requesting further input from the user, a function corresponding to the single target.

Additionally, when a single one of the relative values exceeds the particular threshold, the method may further include performing, without requesting further input from the user, a function corresponding to a particular target of the plurality of targets.

Additionally, when none of the relative values exceeds the particular threshold, the method may further include modifying each of the plurality of targets; and presenting, via the touch screen display, the modified plurality of targets to the user for selection of the intended target of the plurality of targets.

Additionally, the method may further include determining a contact area associated with the touch, wherein, when none of the relative values exceeds the particular threshold, the method may further include zooming in with respect to the contact area.

Additionally, when none of the relative values exceeds the particular threshold, the method may further include performing, without requesting further input from the user, a function corresponding to a particular target, of the plurality of targets, having a relative value that is greater than the relative value of any other target of the plurality of targets.

Additionally, modifying the particular targets may include providing an overlay over each of the particular targets to increase an effective touch-activated area of the particular targets for the selection of the intended target.

Additionally, each of the overlays may include a reference element, and the selection of the intended target comprises receiving input, via a keypad, corresponding to the reference element included in the overlay of the intended target.

Additionally, the method may further include determining a contact area associated with the touch, wherein providing the overlay over each of the particular targets comprises configuring the overlays to have an area equal to or greater than the contact area.

Additionally, modifying the particular targets may include modifying at least one visual characteristic of the particular targets.

Additionally, modifying the at least one visual characteristic may include modifying, based on the relative values, one or more dimensions of the particular targets.

Additionally, the method may further include determining a contact area associated with the touch, wherein modifying the one or more dimensions of the particular targets comprises determining the one or more dimensions based on the contact area In accordance with another aspect, a mobile terminal may include a touch screen to display content; and a processor to: determine a contacted area of the touch screen, wherein the contacted area includes a portion of the content, determine that the portion of the content includes a plurality of first touch-selectable elements, wherein the plurality of first selectable elements includes a user-preferred selectable element, identify, from the plurality of first touch-selectable elements, a plurality of second selectable elements based on one or more parameters indicative of the user-preferred selectable element, wherein the plurality of second selectable elements includes fewer than all of the first selectable elements, and display, via the touch screen, the plurality of second selectable elements.

Additionally, the processor may be further configured to modify, based on a size of the contacted area, a display characteristic of the plurality of second selectable elements prior to display via the touch screen.

Additionally, the plurality of second selectable elements may include the user-preferred selectable element, and the processor may be further configured to receive, via the touch screen, a user input selecting the user-preferred selectable element from the plurality of second selectable elements, and perform an operation related to the user-preferred selectable element.

Additionally, the processor may be further configured to determine, based on the one or more parameters, a particular modification for each of the second selectable elements, and perform the particular modifications prior to display via the touch screen.

Additionally, the processor may be further configured to superimpose a touch-selectable graphic over each of the second selectable elements prior to display via the touch screen, and receive, via one touch-selectable graphic, a user selection of the user-preferred selectable element from the plurality of second selectable elements.

In accordance with yet another aspect, a computer-readable medium having stored thereon a plurality of sequences of instructions which, when executed by at least one processor, cause the at least one processor to: automatically initiate a disambiguation mode in a mobile communication device; determine, in the disambiguation mode, that an ambiguity exists with respect to interpreting a first user input received via contact with a content portion of a display of the mobile communication device; modify the content portion; present, via display, the modified content portion; receive, via contact with the modified content portion, a second user input to resolve the ambiguity; and perform a function, in the mobile communication device, based on the second user input.

Additionally, the instructions may further cause the at least one processor to modify the content portion by altering an area of the content portion, with respect to other displayed content, to provide an effective area in which to receive the second input, wherein the effective area is greater than the area of the content portion.

Additionally, the instructions may further cause the at least one processor to determine at least one of a zoom level with respect to the content portion, a text size with respect to the content portion, an image size with respect to the content portion, dimensions of the display, or resolution associated with the display; and automatically initiate the disambiguation mode based on the at least one of the zoom level, the text size, the image size, the dimensions, or the resolution

BRIEF DESCRIPTION OF THE DRAWINGS

Reference is made to the attached drawings, wherein elements having the same reference number designation may represent like elements throughout.

FIG. 1 is a diagram of an exemplary device in which methods and systems described herein may be implemented;

FIG. 2 is a functional block diagram of exemplary components implemented in the device of FIG. 1;

FIG. 3 is a block diagram of components implemented in the device of FIG. 2 according to an exemplary implementation;

FIGS. 4A, 4B, 4D, and 4E illustrate screen shots of exemplary displays consistent with implementations described herein;

FIG. 4C is a graphical representation of exemplary intermediate processing performed according to an exemplary implementation;

DETAILED DESCRIPTION

Figure 5A:
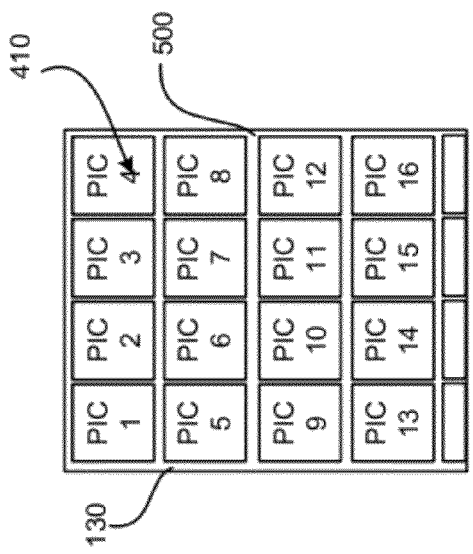
FIGS. 5A and 5B illustrate screen shots of exemplary displays consistent with implementations described herein.

The following detailed description of the invention refers to the accompanying drawings. The same reference numbers in different drawings identify the same or similar elements. Also, the following detailed description does not limit the invention. Instead, the scope of the invention is defined by the appended claims and equivalents.

EXEMPLARY SYSTEM

FIG. 1 is a diagram of an exemplary user device 100 in which methods and systems described herein may be implemented. Typically, user device 100 may include any of the following devices with a display screen: a tablet computer; a mobile telephone; a cellular phone; a personal communications system (PCS) terminal that may combine a cellular radiotelephone with data processing, facsimile, and/or data communications capabilities; a laptop; a personal digital assistant (PDA) that can include a telephone, a media playing device (e.g., an MPEG audio layer 3 (MP3) player, a gaming console device, etc.), a peripheral (e.g., wireless headphone); a digital camera; or another type of computational or communication device.

Referring to FIG. 1, user device 100 may include a housing 110, a speaker 120, a display 130, control buttons 140, a keypad 150, and a microphone 160. Housing 110 may protect the components of user device 100 from outside elements. Speaker 120 may provide audible information to a user of user device 100.

Display 130 may provide visual information to the user. For example, display 130 may provide information regarding incoming or outgoing telephone calls, electronic mail (e-mail), instant messages, short message service (SMS) messages, etc. Display 130 may also display information regarding various applications, such as a messaging or notes application stored in user device 100, a phone book/contact list stored in user device 100, current time, video games being played by a user, content accessed using a web browser, (e.g., downloaded web pages), songs being played by the user, etc.

Consistent with implementations described herein, display 130 may be a touch screen display device that allows a user to enter commands and/or information via a finger, a stylus, a mouse, a pointing device, or some other device. For example, display 130 may be a resistive touch screen, a capacitive touch screen, an optical touch screen, an infrared touch screen, a surface acoustic wave touch screen, or any other type of touch screen device that registers an input based on a contact with the screen/display 130.

Control buttons 140 may permit the user to interact with user device 100 to cause user device 100 to perform one or more operations, such as place a telephone call, play various media, etc. In an exemplary implementation, control buttons 140 may include one or more buttons that control various applications associated with display 130.

Keypad 150 may include a standard telephone keypad. Microphone 160 may receive audible information from the user for communicating and/or activating applications or routines stored within user device 100.

Although user device 100 shown in FIG. 1 includes keypad 150 and a number of control buttons 140, it should be understood that user device 100 need not include such features. Rather, in some implementations, user device 100 may include touch screen display 130 alone, or in combination with more or fewer control buttons 130.

FIG. 2 is a diagram illustrating components of user device 100 according to an exemplary implementation. User device 100 may include a bus 210, a processor 220, a memory 230, an input device 240, an output device 250, and a communication interface 260. Bus 210 may permit communication among the components of user device 100. One skilled in the art would recognize that user device 100 may be configured in a number of other ways and may include other or different elements. For example, user device 100 may include one or more modulators, demodulators, encoders, decoders, etc., for processing data.

Processor 220 may include a processor, microprocessor, an application specific integrated circuit (ASIC), field programmable gate array (FPGA) or other processing logic. Processor 220 may execute software instructions/programs or data structures to control operation of user device 100.

Memory 230 may include a random access memory (RAM) or another type of dynamic storage device that stores information and instructions for execution by processor 220; a read only memory (ROM) or another type of static storage device that stores static information and instructions for use by processor 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processor 220. Instructions used by processor 220 may also, or alternatively, be stored in another type of computer-readable medium accessible by processor 220. A computer-readable medium may include one or more memory devices.

Input device 240 may include mechanisms that permit an operator to input information to user device 100, such as microphone 160, keypad 150, control buttons 140, a keyboard (e.g., a QWERTY keyboard, a Dvorak keyboard, etc.), a gesture-based device, an optical character recognition (OCR)-based device, a joystick, a touch-based device, a virtual keyboard, a speech-to-text engine, a mouse, a pen, voice recognition and/or biometric mechanisms, etc. In an exemplary implementation, display 130 may be a touch screen display that acts as an input device.

Output device 250 may include one or more mechanisms that output information to the user, including a display, such as display 130, a printer, one or more speakers, such as speaker 120, etc. As described above, in an exemplary implementation, display 130 may be a touch screen display. In such an implementation, display 130 may function as both an input device and an output device.

Communication interface 260 may include any transceiver-like mechanism that enables user device 100 to communicate with other devices and/or systems. For example, communication interface 260 may include a modem or an Ethernet interface to a LAN. Communication interface 260 may also include mechanisms for communicating via a network, such as a wireless network. For example, communication interface 260 may include one or more radio frequency (RF) transmitters, receivers and/or transceivers and one or more antennas for transmitting and receiving RF data via a network.

User device 100 may provide a platform for a user to send and receive communications (e.g., telephone calls, electronic mail messages, text messages, multi-media messages, short message service (SMS) messages, etc.), play music, browse the Internet, or perform various other functions. User device 100, as described in detail below, may also perform processing associated with enabling a user to select an item or location on touch screen display 130 in a manner that increases the precision with which the selection is made.

User device 100 may perform these and other operations in response to processor 220 executing sequences of instructions contained in a computer-readable medium, such as memory 230. Such instructions may be read into memory 230 from another computer-readable medium via, for example, communication interface 260. In alternative embodiments, hard-wired circuitry may be used in place of or in combination with software instructions to implement processes consistent with one or more implementations. Thus, implementations described herein are not limited to any specific combination of hardware circuitry and software.

FIG. 3 is an exemplary block diagram of components implemented in user device 100 of FIG. 2. In an exemplary implementation, all or some of the components illustrated in FIG. 3 may be stored in memory 230. For example, referring to FIG. 3, memory 230 may include an operating system (OS) 300, a content application 310, a display control 320, a touch driver 330, a disambiguation engine 340, and content modifying logic 350.

Operating system 300 may include software instructions for managing hardware and software resources of user device 100. Operating system 300 may manage, for example, its file system, device drivers, communication resources (e.g., radio receiver(s), transmission control protocol (TCP)/IP stack), event notifications, etc. Operating system 300 may include Symbian®, Android™, Windows Phone®, Apple® iOS, etc. In an implementation, operating system may be configured to automatically cause one or more devices to operate in a disambiguation mode based on, for example, criteria such as zoom level, text and/or image size, display dimensions, display resolution, etc. In some implementations, a user may manually select the disambiguation mode.

Content application 310 may include any software program or an element of a software program (e.g., a process) executed by processor 220 that displays content items or elements to the user via display 130. Exemplary content application 310 includes an Internet browser, an image or video displaying application, an email client, a text messaging client, an instant messaging client, and productivity applications, such as a word processor, a spreadsheet editor, etc. As used herein, the term "content application" may refer to any application that outputs or otherwise presents text, images, video, or other visual information via touch screen display 130. In an exemplary implementation, an Internet browser may provide one or more links, in a document, that may be activated to navigate to other portions of a document and/or to one or more other documents.

Display control 320 may include logic and/or one or more devices configured to output content from content application 310 via display 130. For example, display control 320 may be configured to optimize and output content associated with content application 310 based on the specifications (e.g., resolution, etc.) associated with touch screen display 130. Display control 320 may control zooming functions (e.g., image magnification and/or demagnification).

Touch driver 330 may include logic and/or one or more devices configured to identify one or more locations on touch screen display 130 corresponding to an area(s) of contact associated with a user's input (e.g., finger) with respect to displayed content. For example, touch driver 330 may be configured to determine the placement of a user's finger, a stylus, or other input device, upon a surface of display 130. In an exemplary implementation, touch driver 330 may be configured to measure a duration, direction, and/or a relative speed of contact to differentiate between incidental (e.g., unintentional) touches, and different types of "recognized touches," for example, a stationary touch (e.g., a single press or tap), a touch gesture (e.g., a press and slide, or flick), etc. One or more aspects of the identified touch may be used for interfacing with user device 100 by one or more various interactions with user device 100.

Touch driver 330 may be configured to generate location information indicative of the contact area. In an exemplary implementation, the location information may include coordinates corresponding to the contact area. In another exemplary implementation, the location information may include the portion of the displayed content that is associated with the contacted area. Touch driver 330 may be configured to provide the location information, for example, to content application 310, display control 320, and/or disambiguation engine 340.

Consistent with implementations described herein, content application 310 and/or touch driver 330 may be configured to determine an initial content selection of the content displayed via display 130. For example, a touch detected by touch driver 330 may cause content application 310 (e.g., an Internet browser) to determine that a user is attempting to activate a link located, at least partially, in the initial content selection. In an exemplary implementation, content application 310 and/or touch driver 330 may be configured to determine whether one—or more than one—target (e.g., selectable element) is associated with the initial content selection. When content application 310 and/or touch driver 330 determines that more than one target (i.e., multiple targets) are associated with the initial content selection, content application 310 and/or touch driver 330 may be configured to forward the initial content selection tent to disambiguation engine 340.

Disambiguation engine 340 may include logic and/or one or more devices to analyze the initial content selection to determine whether and/or the extent to which an ambiguity exists with respect to interpreting the user's intended target. Disambiguation engine 340 may be configured to determine, for example, the number of targets associated with the initial content selection. When multiple targets are associated with the initial content selection, disambiguation engine 340 may identify one or more parameters determined to be indicative of the intended target. Exemplary parameters may include, for example, contextual information with respect to the initial content selection, information associated with the user (e.g., right or left-handed), other selections with respect to the initial content selection, specific locations of each target with respect to the initial content selection (e.g., centralized, peripheral, etc.), the proportion of each target within the initial content selection (e.g., entirely, partially), etc.

In an exemplary implementation, disambiguation engine 340 may be configured to calculate, using one or more particular parameters, relative values associated with respective targets. Disambiguation engine 340 may compare the relative values to a particular threshold (determined, for example, by the disambiguation engine 340). Disambiguation engine 340 may be further configured to determine that a target having a relative value that is below the particular threshold is not the intended target. Disambiguation engine 340 may determine that a target having a relative value that exceeds the particular threshold is a prospective target.

Disambiguation engine 340 may re-calculate, for the prospective targets, the relative values. Disambiguation engine 340 may then compare the re-calculated relative values to a (possibly different) particular threshold. Disambiguation engine 340 may determine that a prospective target having a re-calculated relative value that is below the particular threshold is not the intended target. Disambiguation engine 340 may successively repeat any of the above processes.

Disambiguation engine 340 may further determine whether more than one prospective target is the intended target (i.e., re-calculated relative value exceeds the particular threshold). When disambiguation engine 340 identifies a lone prospective target having a relative value that exceeds the particular threshold, touch driver 330 may, without further user input (i.e., primary resolution of the ambiguity), activate a function corresponding to the sole prospective target. Also, disambiguation engine 340 may be configured to indicate, to content modifying logic 350, two or more prospective targets.

Content modifying logic 350 may include logic and/or one or more devices configured to modify output of content via display 130, for example, the selected content. Content modifying logic 340 may be configured to modify one or more visual characteristics (e.g., size) of the prospective targets. In some implementations, content modifying logic 340 may modify the characteristic by a particular amount (e.g., proportionally) based on the relative values of the prospective targets.

Display control 320 may display re-sized (e.g., enlarged) prospective targets relative to other displayed content. The user may then input a second selection (i.e., a clarification of the first selection) selecting a particular prospective target of the prospective targets, to identify the intended target (secondary resolution of the ambiguity). In some implementations, the prospective targets may be re-sized based upon the initial contact area (i.e., corresponding to the finger size).

In another implementation, content modifying logic 350 may generate a touch-sensitive or touch-responsive overlay to be superimposed over each of the prospective targets, by display control 320, in the originally displayed content, thereby increasing an effective area of the prospective targets. In an implementation, the user may select a particular one of the prospective targets, to clarify the intended target, by directly touching the overlay for the particular prospective target (secondary resolution of the ambiguity). In some implementations, the overlay may include, for example, a reference number. The user may then indicate selection of one of the overlays (for a particular prospective target) by pressing a corresponding number on keypad 150 or, alternatively, by audibly inputting the reference number.

In one implementation, content modifying logic 340 may generate a list of the prospective targets. Display control 320 may present the list of the prospective targets as part of or independently from the originally displayed content from which the initial user selection was inputted. Device 100 may receive input of a user selection of the intended target from the list.

The programs and logic blocks illustrated in FIG. 3 are provided for simplicity. It should be understood that other configurations may be possible. It should also be understood that functions described as being performed by one program or logic block within a program may alternatively be performed by another program and/or another logic block. In addition, functions described as being performed by multiple programs or logic blocks may alternatively be performed by a single program or logic block/device.

Figures 4C, 4D, 4E:
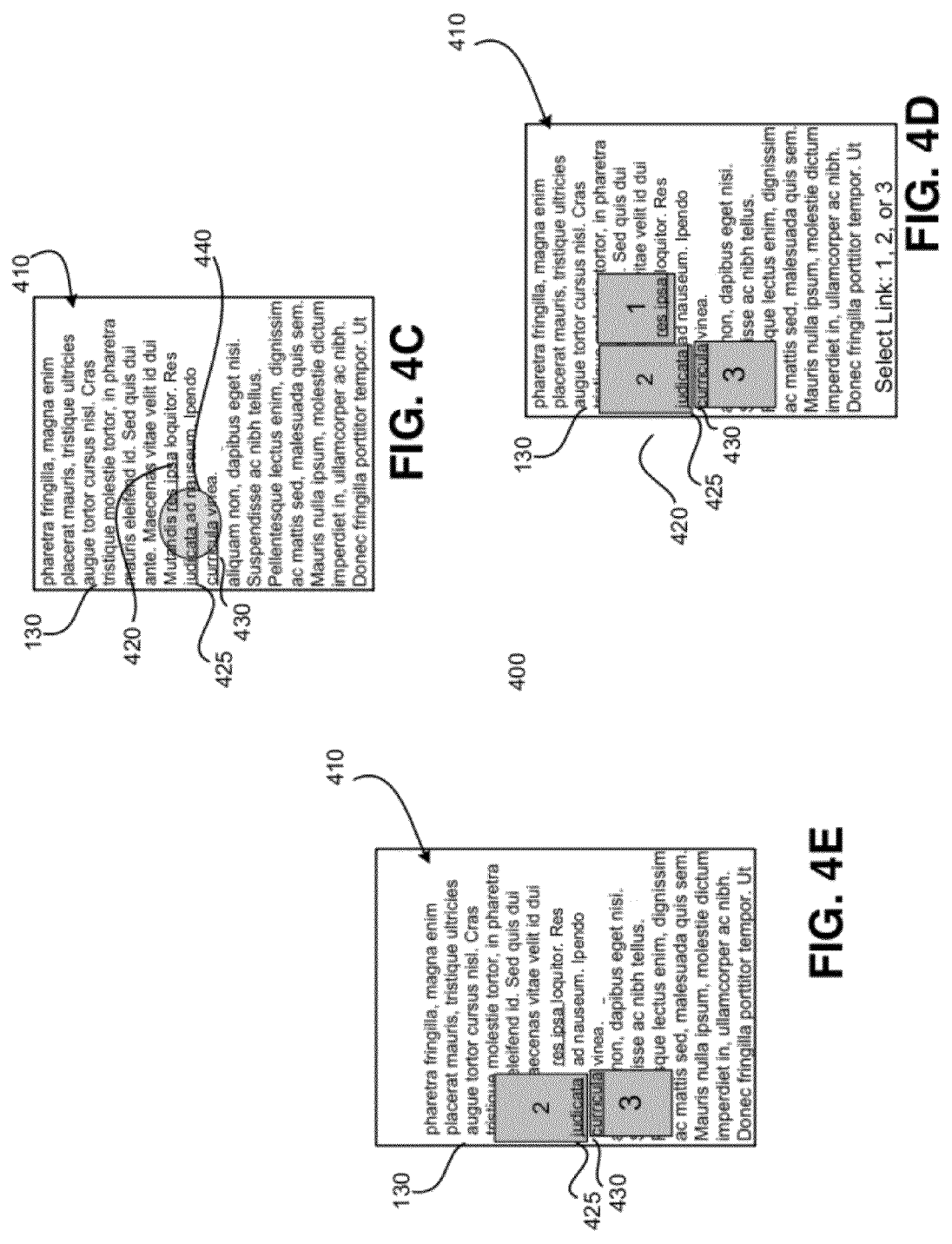

FIGS. 4A to 4B and 4D to 4E are exemplary screen shots of display 130 consistent with implementations described herein. More particularly, FIG. 4A illustrates display 130 presented via an Internet browser. As shown, display 130 may include a content area 410 displaying text content including a number of links 420, 425, 430.

FIG. 4B illustrates display 130 during user interaction (e.g., via finger 400). For example, as described above, touch driver logic 330 may determine that finger 400 has contacted a location within content area 410. FIG. 4C is a graphical representation of a contact area 440 (not visible to the user) identified in content area 410. As described above, content application 310 and/or touch driver 330 may determine that multiple targets (here, links) are associated with contact area 440. Based on the determination, content application 310 and/or touch driver 330 may forward at least a portion of the content of contact area 440 to disambiguation engine 340.

As described above, disambiguation engine 340 may determine the number of targets associated with contacted area 440, here three, i.e., links 420, 425, 430 corresponding to the terms "res ipsa," "judicata," and "curricula," respectively. Also as described above, disambiguation engine 340 may use one or more parameters to calculate a relative value for each link, for example, corresponding to an indication that the user intended to select a particular one of the links. Based on a result that each of links 420, 425, 430 are determined to have relative values that exceed a particular threshold, content modifying logic 340 may create an overlay for each of links 420, 425, 430 which includes, for example, reference numbers 1, 2, 3, respectively, as illustrated in FIG. 4D. The user may then select one of links 420, 425, 430 by touching the corresponding overlay and/or by pressing a corresponding number on keypad 150. FIG. 4E illustrates an example in which disambiguation engine 340 has determined that link 420 is not a prospective link and has identified links 425, 430 as prospective links for presentation (with overlays) to the user for identification of the intended link.

Figure 5B:
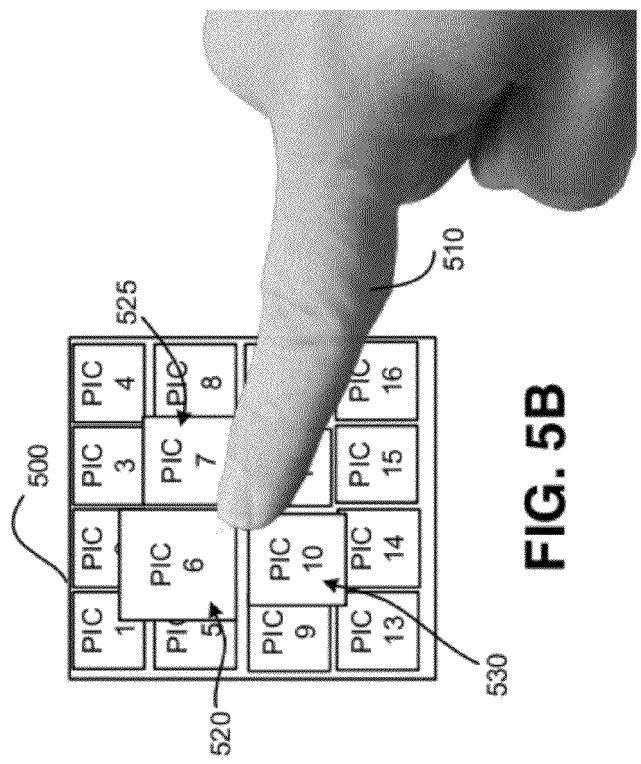

FIGS. 5A and 5B illustrate screen shots of exemplary display 130 consistent with non-textual implementations. As illustrated in FIG. 5A, content area 410 in display 130 may include an image browser or image library 500 having a number of images, labeled PIC1 to PIC16. As shown, in one implementation, display 130 may display an array of thumbnail (e.g., smaller) images for individual images in library 500.

FIG. 5B illustrates display 130 during user interaction (e.g., via finger 510). For example, as described briefly above, touch driver 330 may determine that finger 510, with one "touch," has contacted a portion of PIC 6 (element 520), a portion of PIC 7 (element 525), and a portion of PIC 10 (element 530), in this case, at their junction. In this example, disambiguation engine 340 may determine that relative values for each of PIC 6, PIC 7, PIC 10 exceed a particular threshold value. Content modifying logic may re-size PIC 6, PIC 7, and PIC 10, for example, to be proportionally representative of their respective relative values. The user may then "confirm" the user's initial selection by selecting one of PIC 6 (element 520), PIC 7 (element 525), PIC 10 (element 530), and the corresponding function may be performed (e.g., opening an image file).

Figure 6:
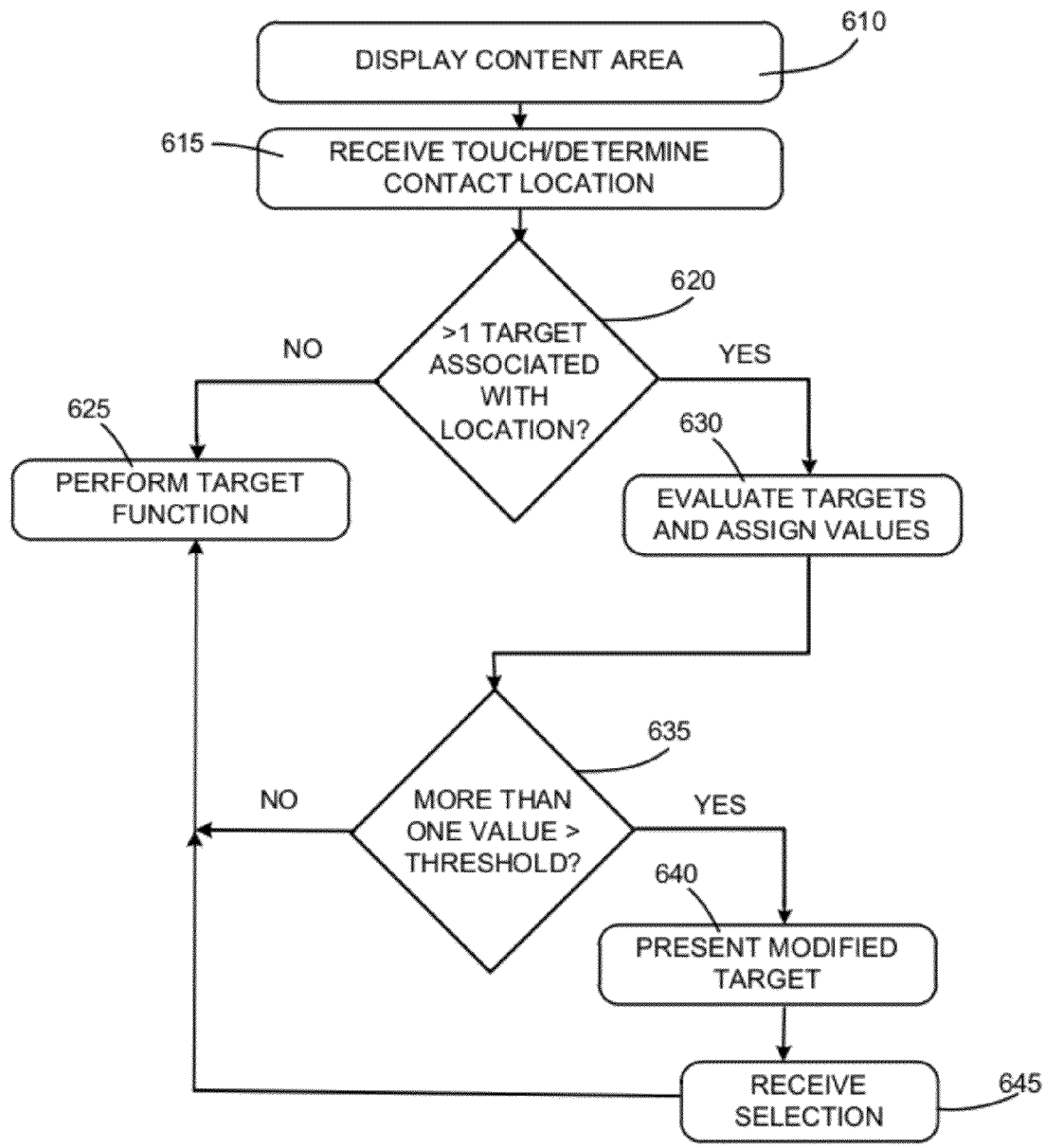
FIG. 6 is a flow diagram illustrating exemplary processing associated with selecting a content item.

FIG. 6 illustrates exemplary processing for selecting content items when device 100 is operated in a disambiguation mode. Processing may begin with user device 100 displaying a content area having a number of content items provided therein (block 610). For example, content application 310 may output content items, such as text characters, images (e.g., thumbnail images), files, etc., using display logic 320.

Device 100 may receive a user interaction (e.g., a touch) (block 615). For example, touch driver 330 may determine that a user has touched touch screen 130, and determine the location of a contact area associated with the touch.

Device 100 may determine whether more than one target is associated with the contact area (block 620). For example, content application 310 and/or touch driver 330 may determine that the contact area includes a single target (block 620—NO). Device 100 may then execute a function corresponding to the selection of the single target, without additional input from the user (block 625). Alternatively, content application 310 may determine that two or more targets are associated with the contact area (block 620—YES).

Disambiguation engine 340 may determine whether other parameters are indicative of an intended target. For example, a percentage of the target that is contacted may be determined for each target. Disambiguation engine 340 may analyze each one of the targets, using one or more the parameters. Based on a result of the analyses, disambiguation engine 340 may assign a relative value to each of the targets (block 630). Disambiguation engine 340 may compare the relative values to a particular threshold to determine if the relative values for more than one of the targets exceed the particular threshold (block 635). If only one prospective target has a relative value that exceeds the particular threshold, device 100 may execute a function corresponding to the selection of the single prospective target, without additional input from the user (block 625). In one implementation, when none of the relative values exceed the particular threshold, device 100 may execute a function corresponding to the selection of the particular target having the greatest relative value (block 625). In one implementation, when none of the relative values exceed the particular threshold, device 100 may interpret the initial selection to be a zoom function, and may adjust a zoom level (e.g., zoom in) with respect to, for example, contact area 440. In one implementation, when at least two of the relative values exceed the particular threshold, device 100 may forward multiple prospective targets, associated with the at least two of the relative values, to disambiguation engine 340 for processing.

Disambiguation engine 340 may notify content modifying logic 350 of the multiple prospective targets. Content modifying logic 350 may modify the content area to present the multiple prospective targets to the user via display 130, for clarification/confirmation of the first selection (block 640). Device 100 may receive user input with respect to the multiple prospective targets, thereby identifying an intended target (block 645). Device may then execute a function corresponding to the selection of the intended target identified by the user input (block 625).

CONCLUSION

Implementations described herein provide a method and device for enabling accurate selection of content items using a touch screen of a user device. In one implementation, upon detecting an initial input, it is determined whether an ambiguity exists with respect to the initial input before activating a function corresponding to the input. If it is determined that the initial input is ambiguous, the user is given the opportunity to clarify/confirm the initial input. Only then (upon confirmation/clarification) is a selected function performed by the user device. In this manner, the number of "miss-hits" is reduced, input selection precision is increased, and overall user experience is thereby improved.

The foregoing description of the embodiments described herein provides illustration and description, but is not intended to be exhaustive or to limit the invention to the precise form disclosed. Modifications and variations are possible in light of the above teachings or may be acquired from the practice of the invention.

Further, while series of acts have been described with respect to FIG. 6, the order of the acts may be varied in other implementations consistent with the invention. Moreover, non-dependent acts may be performed in parallel.

It will also be apparent to one of ordinary skill in the art that aspects of the invention, as described above, may be implemented in computer devices, cellular communication devices/systems, media playing devices, methods, and/or computer program products. Accordingly, aspects of the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an ASIC, an FPGA or other processing logic, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

What is claimed is:

1. A method performed in a user device, the method comprising:
    displaying content via a touch screen display of the user device;
    detecting a touch, of the touch screen display, from a user of the user device;
    determining a location of the touch;
    determining whether the location is associated with a plurality of targets, wherein the plurality of targets includes an intended target;
    determining, when the location is associated with the plurality of targets, a relative value for each of the targets;
    determining whether one, more than one, or none of the relative values exceeds a particular threshold;
    modifying, responsive to determining that more than one of the relative values exceeds a particular threshold, at least one visual characteristic of particular targets of the plurality of targets, relative to other ones of the plurality of targets, associated with the more than one of the relative values; and
    presenting, via the touch screen display, the particular targets to the user for selection of the intended target.

2. The method of claim 1, wherein, responsive to determining that one of the relative values exceeds the particular threshold, the method further comprises:
    performing, without requesting further input from the user, a function corresponding to a particular target of the plurality of targets.

3. The method of claim 1, wherein, responsive to determining that none of the relative values exceeds the particular threshold, the method further comprises:
    modifying each of the plurality of targets; and
    presenting, via the touch screen display, the modified plurality of targets to the user for selection of the intended target of the plurality of targets.

4. The method of claim 1, further comprising:
    determining a contact area associated with the touch, wherein, responsive to determining that none of the relative values exceeds the particular threshold, the method further comprises:
    zooming in with respect to the contact area.

5. The method of claim 1, wherein, responsive to determining that none of the relative values exceeds the particular threshold, the method further comprises:
    performing, without requesting further input from the user, a function corresponding to a particular target, of the plurality of targets, having a relative value that is greater than the relative value of any other target of the plurality of targets.

6. The method of claim 1, wherein modifying at least one visual characteristic of particular targets comprises:
    providing an overlay over each of the particular targets to increase an effective touch-activated area of the particular targets for the selection of the intended target.

7. The method of claim 6, wherein each of the overlays includes a reference element, and the selection of the intended target comprises receiving input, via a keypad, corresponding to the reference element included in the overlay of the intended target.

8. The method of claim 6, further comprising:
    determining a contact area associated with the touch, wherein providing the overlay over each of the particular targets comprises configuring the overlays to have an area equal to or greater than the contact area.

9. The method of claim 1, wherein modifying the at least one visual characteristic comprises modifying, based on the relative values, one or more dimensions of the particular targets.

10. The method of claim 9, further comprising:
    determining a contact area associated with the touch, wherein modifying the one or more dimensions of the particular targets comprises determining the one or more dimensions based on the contact area.

11. A mobile terminal comprising:
    a touch screen to display content; and
    a processor to:
        determine an area of the touch screen contacted by a user, wherein the contacted area includes a portion of the content,
        determine that the portion of the content includes a plurality of first touch-selectable elements, wherein the plurality of first selectable elements includes a user-preferred selectable element,
        identify, from the plurality of first touch-selectable elements, a plurality of second selectable elements based on one or more parameters indicative of the user-preferred selectable element, wherein the plurality of second selectable elements includes fewer than all of the first selectable elements, and
        display, via the touch screen, the plurality of second selectable elements for selection of the user-preferred selectable element.

12. The mobile terminal of claim 11, wherein the processor is further configured to:
    modify, based on a size of the contacted area, a display characteristic of the plurality of second selectable elements prior to display via the touch screen.

13. The mobile terminal of claim 11, wherein the plurality of second selectable elements includes the user-preferred selectable element, and the processor is further configured to:

receive, via the touch screen, a user input selecting the user-preferred selectable element from the plurality of second selectable elements, and perform an operation related to the user-preferred selectable element.

14. The mobile terminal of claim 11, wherein the processor is further configured to:

determine, based on the one or more parameters, a particular modification for each of the second selectable elements, and perform the particular modifications prior to display via the touch screen.

15. The mobile terminal of claim 11, wherein the processor is further configured to:

superimpose a touch-selectable graphic over each of the second selectable elements prior to display via the touch screen, and receive, via one touch-selectable graphic, a user selection of the user-preferred selectable element from the plurality of second selectable elements.

16. A computer-readable medium having stored thereon a plurality of sequences of instructions which, when executed by at least one processor, cause the at least one processor to:

automatically initiate a disambiguation mode in a mobile communication device;

determine, in the disambiguation mode, that an ambiguity exists with respect to interpreting a first user input received via contact with a content portion of a display of the mobile communication device, wherein the content portion includes an intended target;

modify the content portion by proportionally altering different areas of the content portion to provide respective effective areas in which to receive a second user input, wherein the respective effective areas are greater in size than the different areas of the content portion;

present, via display, the modified content portion;

receive, via contact with the modified content portion, the second user input to resolve the ambiguity; and perform a function corresponding to the intended target, in the mobile communication device, based on the second user input.

17. The computer-readable medium of claim 16, wherein the instructions further cause the at least one processor to:

determine at least one of a zoom level with respect to the content portion, a text size with respect to the content portion, an image size with respect to the content portion, dimensions of the display, or resolution associated with the display; and automatically initiate the disambiguation mode based on the at least one of the zoom level, the text size, the image size, the dimensions, or the resolution.

* * * * *